(12) United States Patent
Nishikawa et al.

(10) Patent No.: US 8,478,279 B2
(45) Date of Patent: Jul. 2, 2013

(54) CLOSED-LOOP TRANSMISSION POWER CONTROL METHOD AND RADIO BASE STATION APPARATUS

(75) Inventors: Daisuke Nishikawa, Kanagawa (JP); Yoshihisa Kishiyama, Kanagawa (JP); Mamoru Sawahashi, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 206 days.

(21) Appl. No.: 13/055,631

(22) PCT Filed: Jul. 9, 2009

(86) PCT No.: PCT/JP2009/062503
§ 371 (c)(1),
(2), (4) Date: Apr. 11, 2011

(87) PCT Pub. No.: WO2010/010818
PCT Pub. Date: Jan. 28, 2010

(65) Prior Publication Data
US 2011/0190026 A1 Aug. 4, 2011

(30) Foreign Application Priority Data
Jul. 24, 2008 (JP) ................................. 2008-191384

(51) Int. Cl.
*H04W 40/00* (2009.01)
(52) U.S. Cl.
USPC ........................................... 455/446; 455/42
(58) Field of Classification Search
USPC .............................. 455/443, 69, 522, 24, 446
See application file for complete search history.

(56) References Cited

U.S. PATENT DOCUMENTS
8,190,092 B1 * 5/2012 Lee ............................. 455/63.1
2009/0149140 A1 * 6/2009 Borran et al. ............... 455/114.2

OTHER PUBLICATIONS

3GPP TS 36.213 V8.2.0, Mar. 2008, "Evolved Universal Terrestrial Radio Access (E-UTRA); Physical layer procedures," 30 pages.
International Search Report issued in PCT/JP2009/062503, mailed on Oct. 20, 2009, with translation, 3 pages.
Japanese Office Action for Japanese Patent Application No. 2008-191384, mailing date Feb. 19, 2013, with English translation thereof (4 pages).

* cited by examiner

*Primary Examiner* — Tu X Nguyen
(74) *Attorney, Agent, or Firm* — Osha Liang LLP (57) ABSTRACT

To set an optimal transmission power control interval such that a base station apparatus properly receives signals from a mobile station, while exploiting fast scheduling and fast AMC, in this closed-loop transmission power control method, reception SINR and average interference level are measured in a signal received in uplink, a time period for averaging reception quality is determined corresponding to an overlapped size of a dynamic range of a base station apparatus that is a region of overlapping a first reception-allowable range depend on reception capability of the base station apparatus, with a second reception-allowable range, varying corresponding to the interference level, depend on the number of a modulation and coding scheme set, each set achieving required throughput, the reception SINR is averaged using the determined time period, and a TPC command indicative of uplink transmission power to be controlled in a terminal apparatus is generated using a difference value between the averaged reception SINR and target reception SINR, and is transmitted in downlink.

6 Claims, 7 Drawing Sheets

| MCS set Index | [Modulation] | [Coding rate] | [Efficiency] |
|---|---|---|---|
| 0 | 2 | 0.1171875 | 0.2344 |
| 1 | 2 | 0.18847656 | 0.377 |
| 2 | 2 | 0.30078125 | 0.6016 |
| 3 | 2 | 0.43847656 | 0.877 |
| 4 | 2 | 0.58789063 | 1.1758 |
| 5 | 4 | 0.33203125 | 1.3262 |
| 6 | 4 | 0.42382813 | 1.69535 |
| 7 | 4 | 0.54003906 | 2.1602 |
| 8 | 4 | 0.64257813 | 2.5684 |
| 9 | 6 | 0.45507813 | 2.7305 |
| 10 | 6 | 0.55371094 | 3.3223 |
| 11 | 6 | 0.65039063 | 3.9023 |
| 12 | 6 | 0.75390625 | 4.5234 |
| 13 | 6 | 0.85253906 | 5.1152 |
| 14 | 6 | 0.92578125 | 5.5547 |

※MODULATION SCHEME 2:QPSK
　　　〃　　　4:16QAM
　　　〃　　　6:64QAM

CLOSED-LOOP TRANSMISSION POWER CONTROL METHOD AND RADIO BASE STATION APPARATUS

TECHNICAL FIELD

The present invention relates to a closed-loop transmission power control method and radio base station apparatus for performing uplink transmission power control in closed loop.

BACKGROUND ART

In uplink of W-CDMA, signals from user equipments (UE) in the same cell are multiplied by scramble codes specific to users and signals received in base station is non-orthogonal. Therefore fast transmission power control (TPC) is essential to reduce the multi-user interference (i.e. the near-far problem).

Meanwhile, in the LTE (Long Term Evolution) system defined by 3 GPP Release 8 (hereinafter, referred to as "Rel-8 LTE"), in uplink is adopted SC-FDMA (Single-Carrier Frequency Division Multiple Access) radio access that actualizes low Peak-to Average Power Ratio (PAPR) and that is effective at increasing coverage. Accordingly, by scheduling in the base station, basically, since radio resources of frequency and time domains are assigned to a single UE, orthogonality in the frequency and time domains is achieved among users in the same cell. Therefore, from the viewpoint of suppressing multi-user interference in the same cell, fast TPC is not always essential. However, in Rel-8 LTE, since one-cell reuse is basically adopted, interference from adjacent cells is significant, and particularly, the interference level from the UE existing at the cell edge is high. Therefore, it is necessary to apply TPC also in LTE to compensate for such adjacent-cell interference and to obtain the required reception quality.

In uplink based on Rel-8 LTE are defined 1) Physical Random Access Channel (PRACH), 2) Physical Uplink Shared Channel (PUSCH), and 3) Physical Uplink Control Channel (PUCCH). Particularly, the PUSCH is, a physical channel to transmit user data, applied frequency domain scheduling for assigning frequency blocks with high received signal levels to each user optimally based on adaptive modulation and channel coding (AMC) corresponding to the received channel state. To respond to the instantaneous fading variation, fast frequency domain scheduling and fast AMC is executed for each TTI (Transmission Time Interval) with a length of 1 msec. In this case, it is possible to respond to the instantaneous fading variation by adaptive rate control using AMC, and slow TPC is used to respond to propagation loss from the base station and variations in adjacent-cell interference. The transmission power control of the PUSCH in uplink is controlled by a combination of open-loop TPC based on parameters (Po, α, etc.) notified from the base station at relatively long intervals and a propagation loss value measured by the mobile station, and closed-loop TPC based on intermediate variations of the received signal level due to shadowing and TPC command notified at relatively short intervals to compensate for a setting error in transmission power in the UE (3GPP, TS36. 213). In closed-loop TPC between the base station and mobile station, for example, the base station calculates a difference value between the reception SINR (Signal to Interference plus Noise Ratio) averaged by a time period t and target SINR, notifies the difference value as a TPC command to the mobile station, and thus controls the transmission power in the mobile station.

Citation List
Non-Patent Literature
Non-patent Literature 1
3GPP, TS 36.213, V8.2.0, "Evolved Universal Terrestrial Radio Access (E-UTRA); Physical layer procedures"

SUMMARY OF INVENTION

Technical Problem

However, in the link to which is applied fast frequency domain scheduling and fast AMC, when the control interval of closed-loop TPC is fixed to relatively long time (low-rate) to obtain high gain in the fast frequency domain scheduling and fast AMC, the error of the received signal increases, the signal falls outside the dynamic range of the receiver in the base station, and there is a possibility that it is not possible to perform communications.

The present invention was made in view of the respect, and it is an object of the invention to provide a closed-loop transmission power control method and radio base station apparatus for achieving an optimal transmission power control interval so that the base station apparatus operates properly.

Solution to Problem

A closed-loop transmission power control method of the invention is characterized by initially setting a time period for averaging reception quality corresponding to an overlapped size of a region of overlapping a first reception-allowable range depended on reception capability of a base station apparatus, with a second reception-allowable range depended on the number of a modulation and coding scheme set, each set achieving required throughput, measuring reception quality and an interference level of a signal received in uplink, defining the overlapped size corresponding to the measured interference level to vary the time period, corresponding to the defined overlapped size, averaging the reception quality during the varied time period to generate transmission power control information indicative of uplink transmission power to be controlled in a terminal apparatus using a difference value between the averaged reception quality and target reception quality and transmitting the generated transmission power control information to the terminal apparatus in downlink.

According to this constitution, since the overlapped size is a dynamic range enabling the base station apparatus to receive signals from the UE properly, and the time period for averaging reception quality is determined corresponding to the overlapped size, it is possible to determine the time period so as to adequately have the merits of fast frequency domain scheduling and fast AMC when the dynamic range is wide, while determining the time period so as to reduce the probability that the reception SNR (Signal to Noise Ratio) falls outside the dynamic range when the dynamic range is narrow, and it is thereby possible to prevent the occurrence of situations disabling communications due to out of the first reception-allowable range and the second reception-allowable range.

Technical Advantage of Invention

According to the invention, it is possible to set the optimal transmission power control interval such that the base station apparatus operates properly.

DESCRIPTION OF EMBODIMENTS

Embodiments of the invention will specifically be described below with reference to accompanying drawings.

Described is a transmission power control method in uplink based on Rel-8 LTE.

Figure 1:
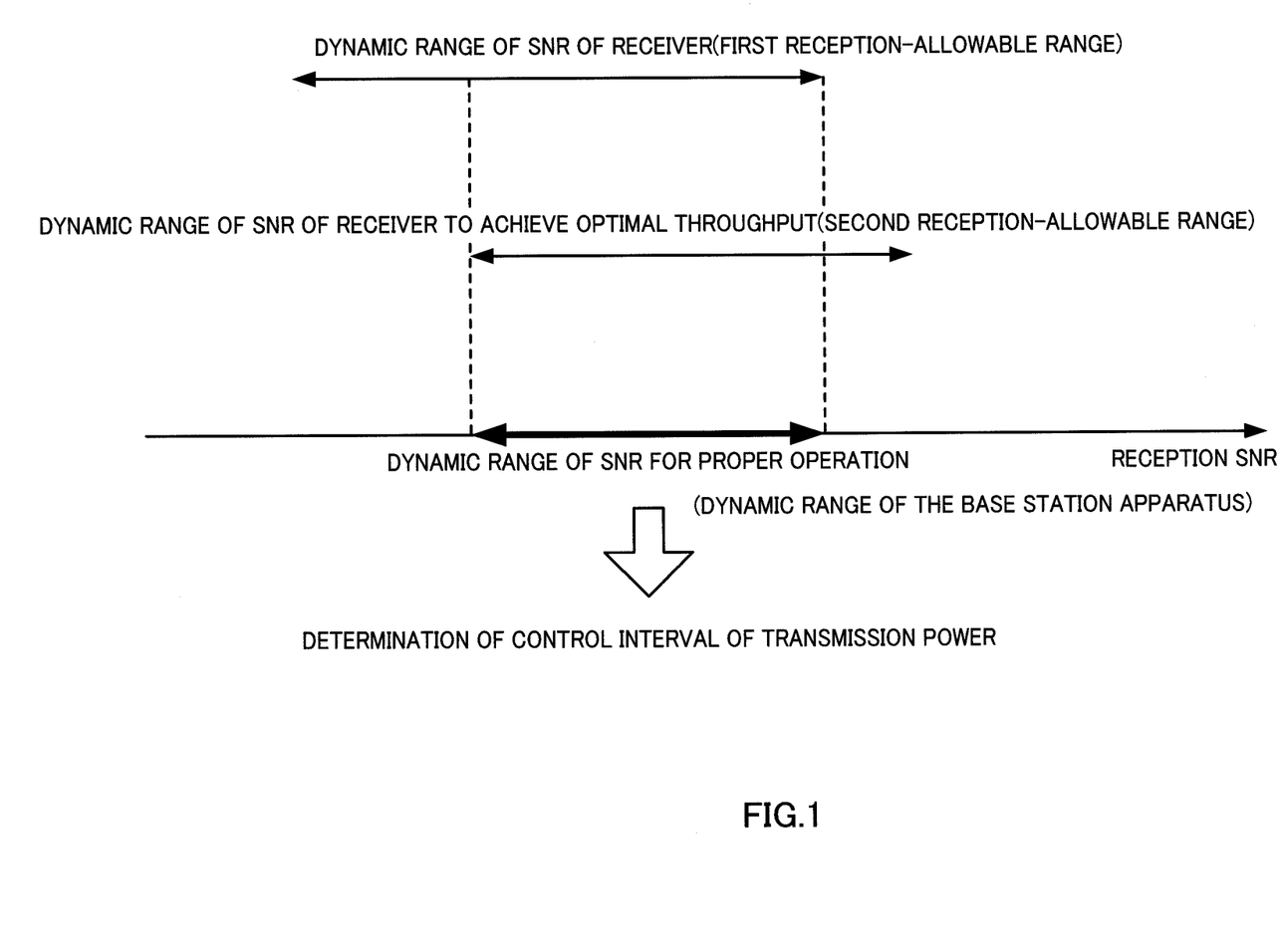
FIG. 1 is a conceptual diagram of a method of determining a TPC control interval in an Embodiment of the invention.

FIG. 1 shows the concept of a determining method of a time period for averaging reception quality in deciding a TPC command. The time period for averaging reception quality is a TPC control interval.

A radio base station has a range (hereinafter, referred to as a "first reception-allowable range") of signal strength (reception level) enabling signals transmitted from a mobile station to be received. The first reception-allowable range is dependent on performance of a receiver in the radio base station, and is principally determined by accuracy of AGC (Automatic Gain Control), and a sampling rate and the number of quantization bits of an A/D converter. The first reception-allowable range is defined by reception SNR (Signal to Noise Ratio) to enable comparison with a second reception-allowable range described later. The reception SNR in some frequency range assigned to a user is expressed by an absolute value of a ratio of an original signal transmitted from the user terminal (mobile station) to background noise. Since the variation in background noise is smaller than that in the original signal subjected to transmission power control in the mobile station, it is possible to define the first reception-allowable range using the reception SNR as a substitute for the reception power. Such a situation occurs that it is not possible to perform communications, when the reception SNR in the receiver of the radio base station falls outside the first reception-allowable range due to transmission power control in the mobile station.

Figure 2:
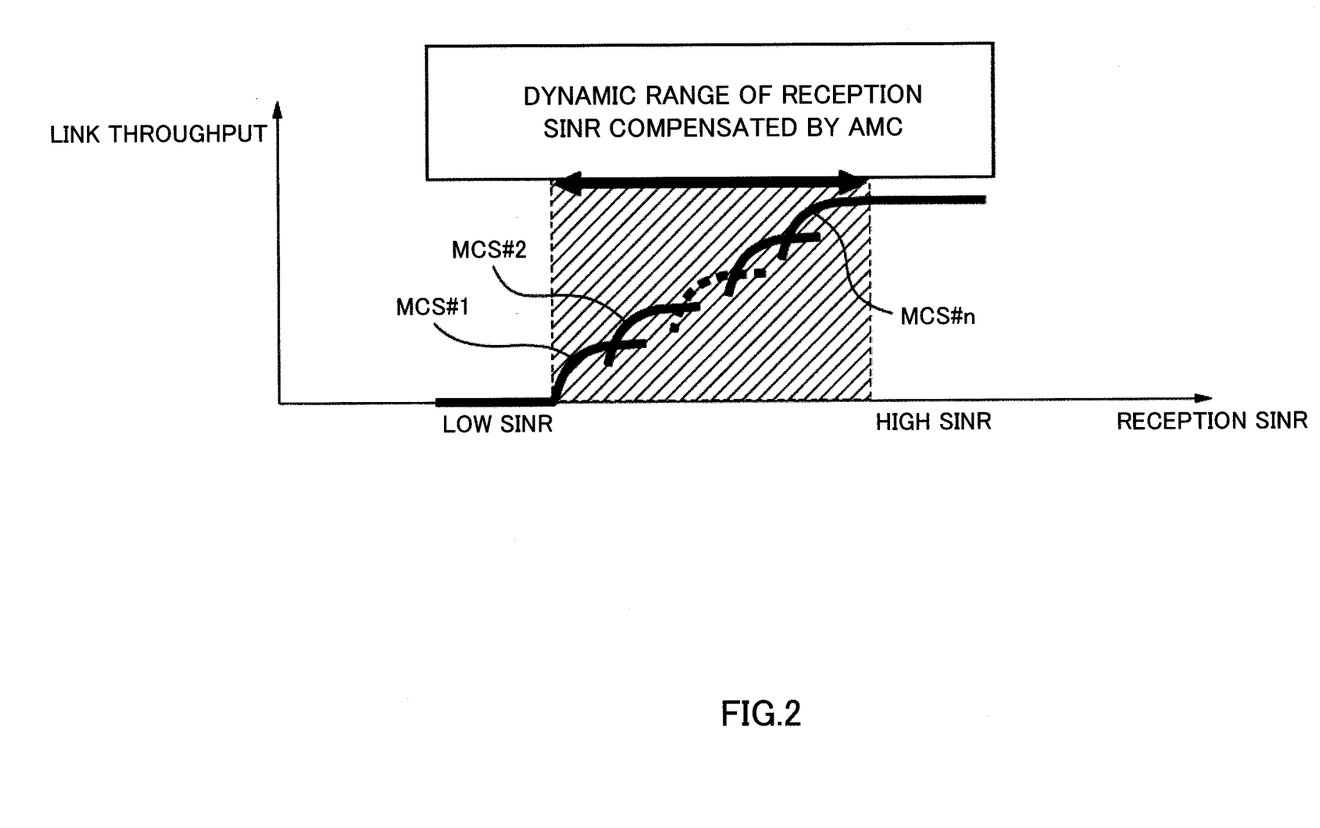
FIG. 2 is a diagram illustrating a dynamic range of reception SINR compensated by AMC.

Meanwhile, in the radio base station, the range of throughput required in the system is beforehand determined, and further determined is the number of combinations (hereinafter, referred to as "the number of MCS sets") each of a modulation scheme and coding rate (MCS: Modulation and Coding Scheme) to achieve the required throughput. The radio base station has a range (hereinafter, referred to as a "second reception-allowable range") of reception quality depend on the number of MCS sets to achieve required throughput. The reception SNR is used as the reception quality to adapt the dimension to that of the first reception-allowable range. The second reception-allowable range varies corresponding to the average interference level. When the reception SNR in the receiver of the radio base station falls outside the second reception-allowable range due to transmission power control in the mobile station, it is not possible to achieve required throughput. FIG. 2 is a diagram illustrating the dynamic range of reception SINR compensated by AMC. By a combination of the modulation scheme and coding rate, throughput is determined that is capable of being achieved with respect to the reception SINR. For example, MCS #1 is an MCS set enabling communications to be performed with low reception quality in low throughput, and MCS #n is an MCS set enabling high throughput to be achieved using high reception quality. As shown in FIG. 2, as the number of MCS sets increases, the reception SINR dynamic range is wider to achieve required throughput. The similar relationship is established when the reception SINR is replaced with the reception SNR in FIG. 2.

Accordingly, an overlapping region in which the first reception-allowable range and the second reception-allowable range overlap each other is the reception SNR dynamic range (hereinafter, referred to as a "dynamic range of the base station apparatus) to operate the radio base station properly. The dynamic range of the base station apparatus varies corresponding to reception capability of a receiver in each radio base station, the number of MCS sets supported in the system, and average interference level measured in the receiver. The reception capability of the radio base station and the number of MCS sets supported in the system is fixed for each radio base station. Therefore, the time period for averaging reception quality is initially set corresponding to the dynamic range size of the base station apparatus depended on the reception capability in the radio base station and the number of MCS sets supported in the system. The second reception-allowable range varies corresponding to the interference level. Therefore, since the dynamic range of the base station apparatus also varies corresponding to the interference level in communications, the time period for averaging reception quality is dynamically varied corresponding to the variation of the dynamic range of the base station apparatus.

When the dynamic range of the base station apparatus is wide, in the case of setting the target reception SINR at the center of the dynamic range of reception SINR as shown in FIG. 2, the probability that the reception SINR falls outside the dynamic range is reduced. In other words, corresponding to reductions in the probability that the reception SINR falls outside the dynamic range, it is possible to lengthen the control interval of TPC (the time period "t" averaging reception SINR). When the dynamic range of the base station apparatus is wide, the control interval of TPC is lengthened, and it is possible to exploit the maximum effects of fast frequency domain scheduling and fast AMC. In addition, in the link to which is applied fast frequency domain scheduling and fast AMC, when the control interval of closed-loop TPC is set at a short interval and TPC is made faster to the extent that the instantaneous fading variation can be tracked, it is possible to reduce the probability of falling outside the dynamic range of the base station apparatus. However, in such a case, the reception level of each user is controlled to the same level, so that the merits of applying fast frequency domain scheduling and fast AMC are reduced.

Meanwhile, when the dynamic range of the base station apparatus is narrow, even in setting the target reception SINR at the center of the dynamic range of reception SINR as shown in FIG. 2, the probability that the reception SINR falls outside the dynamic range is high. By shortening the control interval of TPC, the error is reduced, and the probability that the reception SINR falls outside the dynamic range is decreased. In other words, corresponding to reductions in the control interval of TPC (the time period "t" for averaging reception SINR), it is possible to decrease the probability that the reception SINR falls outside the dynamic range. When the dynamic range of the base station apparatus is narrow, the control interval of TPC is shortened, and the probability that the reception SINR falls outside the dynamic range is reduced.

As described above, the control interval of TPC (the time period "t" for averaging reception SINR) is determined corresponding to the dynamic range size of the base station apparatus. The base station apparatus measures the reception SINR of a received signal from the mobile station, and averages the reception SINR using the time period "t" determined corresponding to the dynamic range size of the base station apparatus. For example, the base station apparatus notifies the mobile station of a difference value between the target reception SINR and averaged reception SINR as a TPC command. The mobile station controls the uplink transmission power according to the TPC command notified from the radio base station.

In a specific example as shown in FIG. 1, the minimum value of the second reception-allowable range is higher than the minimum value of the first reception-allowable range. This indicates that the receiver of the radio base station is capable of receiving signals of low reception levels that cannot achieve throughput required by the system. When the first reception-allowable range and the second reception-allowable range have the aforementioned relationship, the region that cannot achieve throughput required by the system within the first reception-allowable range falls outside the dynamic range of the base station apparatus. Further, the maximum value of the second reception-allowable range is higher than the maximum value of the first reception-allowable range. This indicates that the system supports the MCS set capable of supporting a high reception level that saturates the receiver of the radio base station. When the first reception-allowable range and the second reception-allowable range have the aforementioned relationship, the region that is not supported by reception capability of the receiver within the second reception-allowable range falls outside the dynamic range of the base station apparatus. Accordingly, the dynamic range of the base station apparatus determined as described above defines the range such that the base station apparatus operates normally from both viewpoints of reception capability of the receiver and the support capability of the system. Based on such a dynamic range of the base station apparatus, the time period for averaging reception quality is initially set. In cases other than the case as shown in FIG. 1, by enhancing reception capability of a receiver, the receiver may have the first reception-allowable range covering the entire second reception-allowable range.

Figure 3:
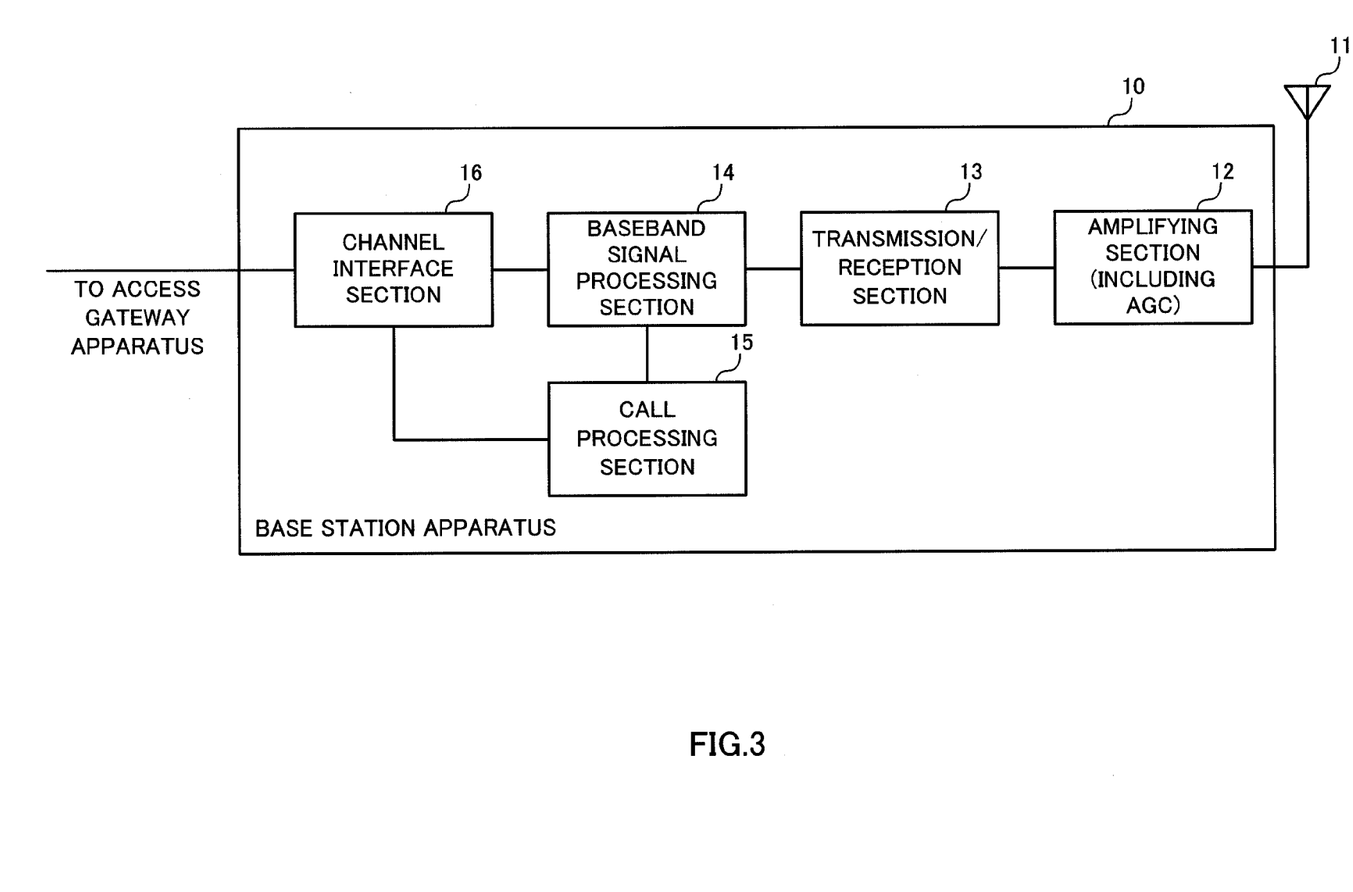
FIG. 3 is a functional block diagram illustrating a functional configuration of a base station apparatus according to an Embodiment of the invention.

FIG. 3 is a functional block diagram of the base station apparatus according to the Embodiment of the invention. The base station apparatus 10 has a transmission/reception antenna 11, amplifying section 12, transmission/reception section 13, baseband signal processing section 14, call processing section 15, and channel interface section 16.

For uplink data, a radio-frequency signal received in the transmission/reception antenna 11 is amplified in the amplifying section 12 so that the reception power is corrected to certain power under AGC. AGC accuracy of the amplifying section 12 is one of elements to determine the first reception-allowable range. The transmission/reception section 13 converts the amplified radio-frequency signal into a baseband signal by frequency conversion. This amplified baseband signal is subjected to despreading, RAKE combining and error correcting decoding in the baseband signal processing section 14, and then, is transferred to an access gateway apparatus via the channel interface section 16. The access gateway apparatus is connected to a core network, and manages each mobile station. Further, with respect to uplink, the reception SINR and interference level of the radio signal received in the base station apparatus 10 is measured based on the uplink baseband signal.

The downlink packet data is input to the baseband signal processing section 14 from the upper layer via the channel interface section 16. The baseband signal processing section 14 performs the processing of retransmission control (H-ARQ (Hybrid ARQ), scheduling, transmission format selection, channel coding and despreading on the signal, and transfers the signal to the transmission/reception section 13. The transmission/reception section 13 performs frequency conversion processing for converting the baseband signal output from the baseband signal processing section 14 into a radio frequency signal, and then, the signal is amplified in the amplifying section 12 and transmitted via the transmission/reception antenna 11.

Figure 4:
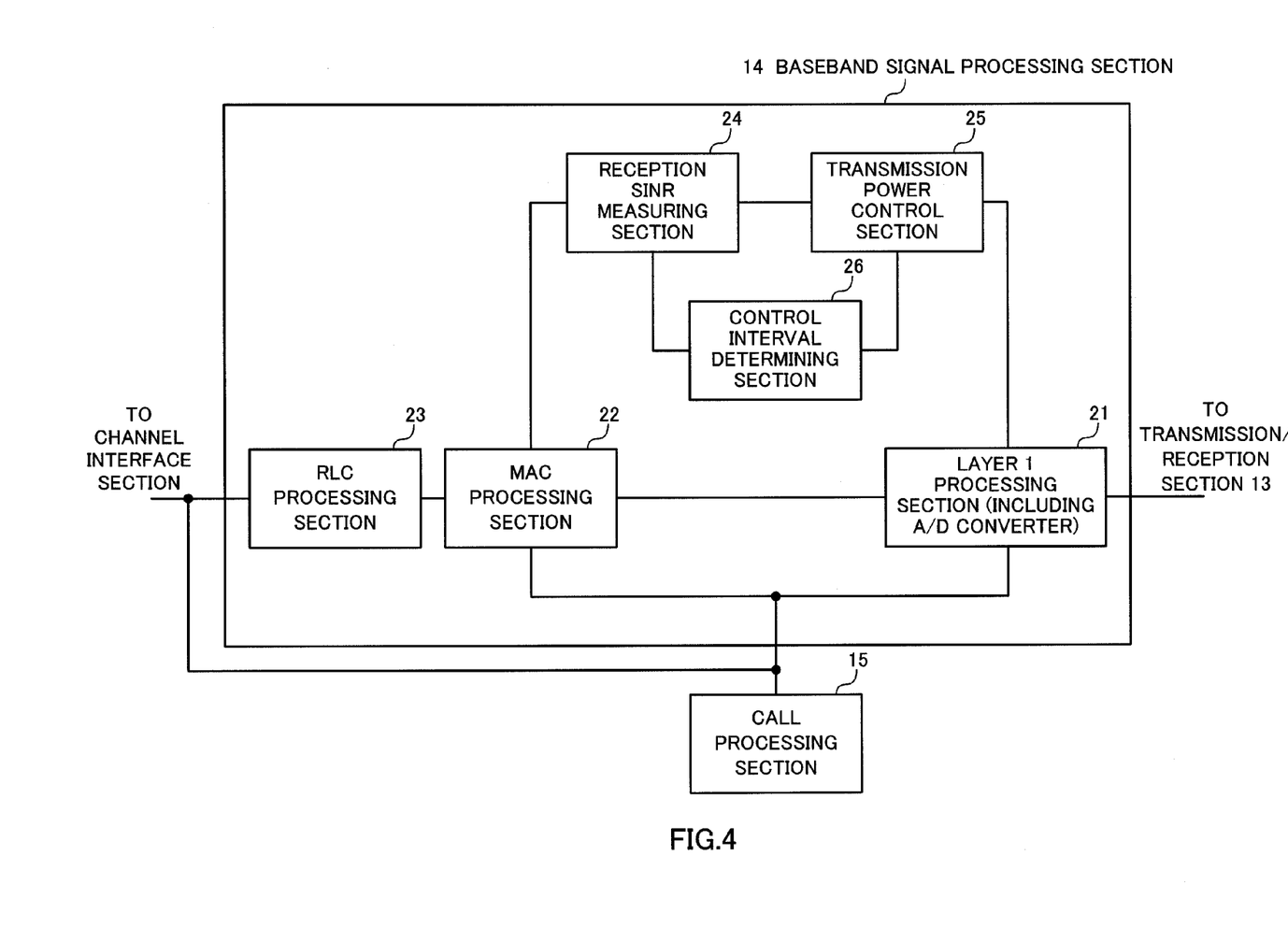
FIG. 4 is a functional block diagram of a functional configuration of a baseband signal processing section as shown in FIG. 3.

FIG. 4 is a functional block diagram illustrating the functional configuration of the baseband signal processing section 14.

The baseband signal processing section 14 has a layer 1 processing section 21 having an A/D converter, MAC (Medium Access Control) processing section 22, RLC processing section 23, reception SINR measuring section 24, transmission power control section 25 and control interval determining section 26. In addition, the control interval determining section 26 may be a functional section included in the transmission power control section 25.

The layer 1 processing section 21 principally performs processing associated with the physical layer, and performs A/D conversion on the signal from the transmission/reception section 13 using the A/D converter. The sampling rate and the number of quantization bits of the A/D converter are elements that determine the first reception-allowable range. For example, the layer 1 processing section 21 performs processing of channel decoding, Discrete Fourier Transform (DFT), frequency demapping, Inverse Fast Fourier Transform (IFFT), data demodulation, transmission power control of uplink and downlink dedicated channels and the like on the signal received in uplink. Further, the section 21 performs processing of channel coding, data modulation, frequency mapping, inverse fast Fourier transform (IFFT) and like on the signal to transmit in downlink.

Figure 5:
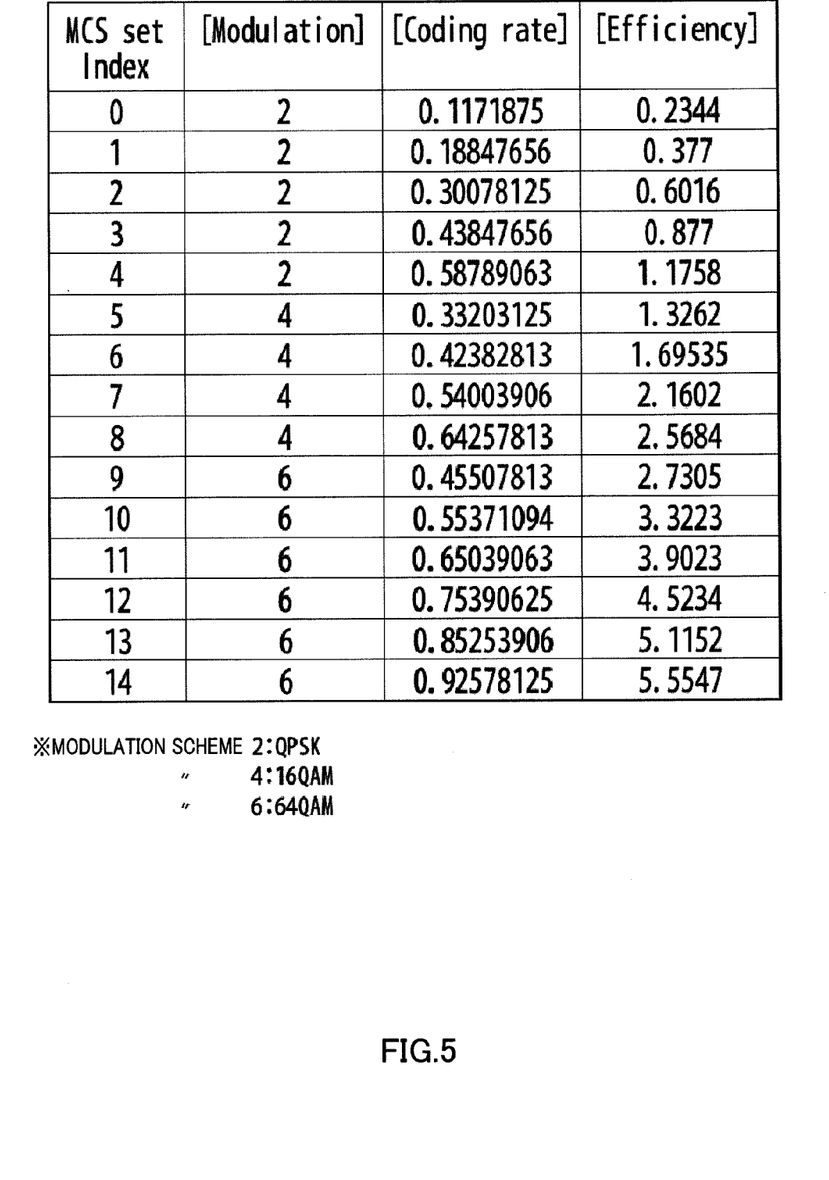
FIG. 5 is a table showing a specific example of MCS sets selectable in the base station apparatus.

The MAC processing section 22 performs processing of Hybrid Automatic Repeat reQuest (HARQ) in the MAC layer on a signal received in uplink/downlink, scheduling in uplink/downlink, selection of transmission format of PUSCH/PDSCH (including a determination of the MCS set in AMC), selection of resource blocks of PUSCH/PDSCH and the like. The base station apparatus 10 is capable of selecting a suitable set in a plurality of MCS sets used in AMC. FIG. 5 is a table showing a specific example of MCS sets selectable in the base station apparatus 10. As shown in FIG. 5, for example, the base station apparatus 10 supports 15 (index 0 to index 14) MCS sets. In other words, spectral efficiency of the MCS set is determined by a combination of the modulation scheme and coding rate, and 15 MCS sets ranging from high spectral efficiency to low spectral efficiency are prepared. The number of thus selectable MCS sets is one of elements that determine the second reception-allowable range.

The RLC processing section 23 performs separation of packets, combining of packets, retransmission control in the RLC layer and the like on packets received in uplink and packets to be transmitted in downlink via the channel interface section 16.

The reception SINR measuring section 24 measures reception quality (for example, reception SINR) of a reference signal received in uplink. Generally, the reference signal includes Sounding RS transmitted regularly in the entire system band, and Demodulation RS for demodulation transmitted in only a band of particular resource blocks accompanying the PUSCH. The reception SINR measuring section 24 also measures the interference level of the reference signal.

The control interval determining section 26 monitors the dynamic range of the base station apparatus, and determines the control interval of TPC corresponding to the dynamic range size of the base station apparatus. The principal elements that determine the dynamic range of the base station apparatus are AGC accuracy in the amplifying section 12, the sampling rate and the number of quantization bits in the A/D converter in the layer 1 processing section 21, the number of MCS sets selectable in the MAC processing section 22, and the interference level of the reference signal measured in the reception SINR measuring section 24. The AGC accuracy, the sampling rate and the number of quantization bits in the A/D converter and the number of MCS sets are known data. Accordingly, defined is the dynamic range of the base station apparatus determined from the AGC accuracy, the sampling rate and the number of quantization bits in the A/D converter and the number of MCS sets, and the suitable time period for averaging reception quality is initially set corresponding to the dynamic range size. After starting communications, the dynamic range of the base station apparatus is varied in conjunction with the interference level measured in the reception SINR measuring section 24. The time period for averaging reception quality is varied corresponding to the dynamic range size of the base station apparatus. The varied time period is provided to the transmission power control section 25.

The transmission power control section 25 averages reception SINRs using the time period "t" provided from the control interval determining section 26, and for example, generates a difference value between the target reception SINR and the averaged reception SINR as a TPC command. The TPC command that is varied corresponding to the dynamic range size of the base station apparatus is output to the layer 1 processing section 21.

The call processing section 15 transmits and receives call control signals to/from a radio control station that is the upper layer, and performs status control of the base station 10 and resource allocation. In addition, the processing of the layer 1 processing section 21 and MAC processing section 22 is performed based on conditions of communications between the base station 10 and the mobile station set in the call processing section 15.

Described next is link adaptation between the base station apparatus 10 and the mobile station each configured as described above.

Figure 6:
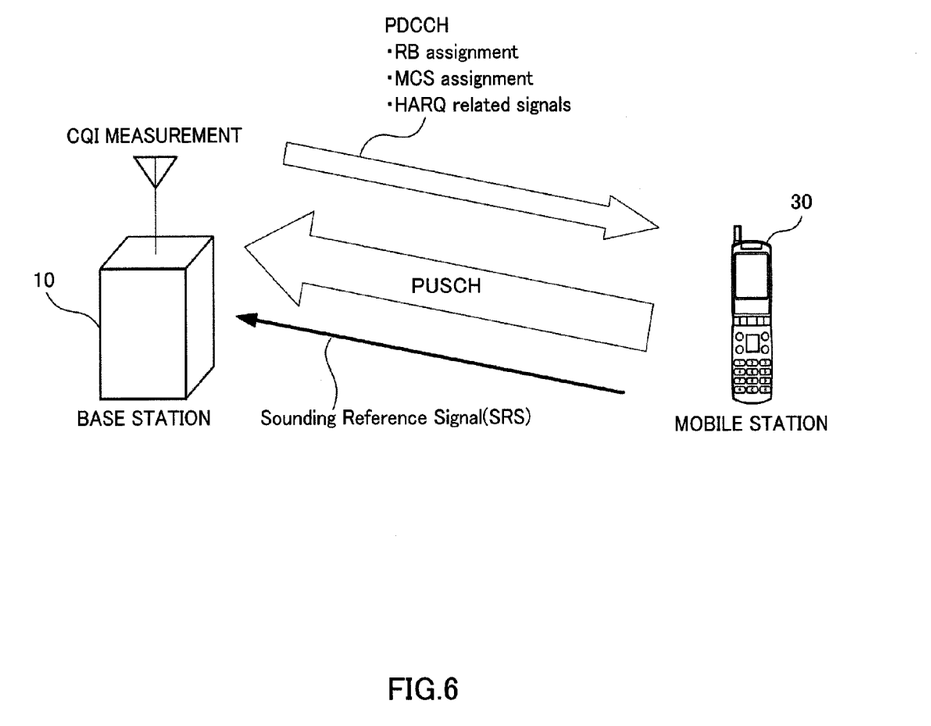
FIG. 6 is a diagram showing the outline of link adaptation in uplink based on Rel-8 LTE.

FIG. 6 shows the outline of link adaptation in uplink based on Rel-8 LTE. The base station apparatus 10 measures channel quality information (CQI) of each user using Sounding RS transmitted from the mobile station 30 to the base station apparatus 10, and assigns each resource block to users (scheduling), and determination of the MCS set (AMC). The base station apparatus 10 notifies the mobile station 30 of the determined resource block assignment information and the information of the MCS set (and information on retransmission (HARQ)) on the Physical Downlink Control Channel (PDCCH). The mobile station 30 performs data transmission according to the information notified from the base station apparatus 10.

In link adaptation as described above, the determination of the TPC control interval and closed-loop TPC is performed as described below.

Figure 7:
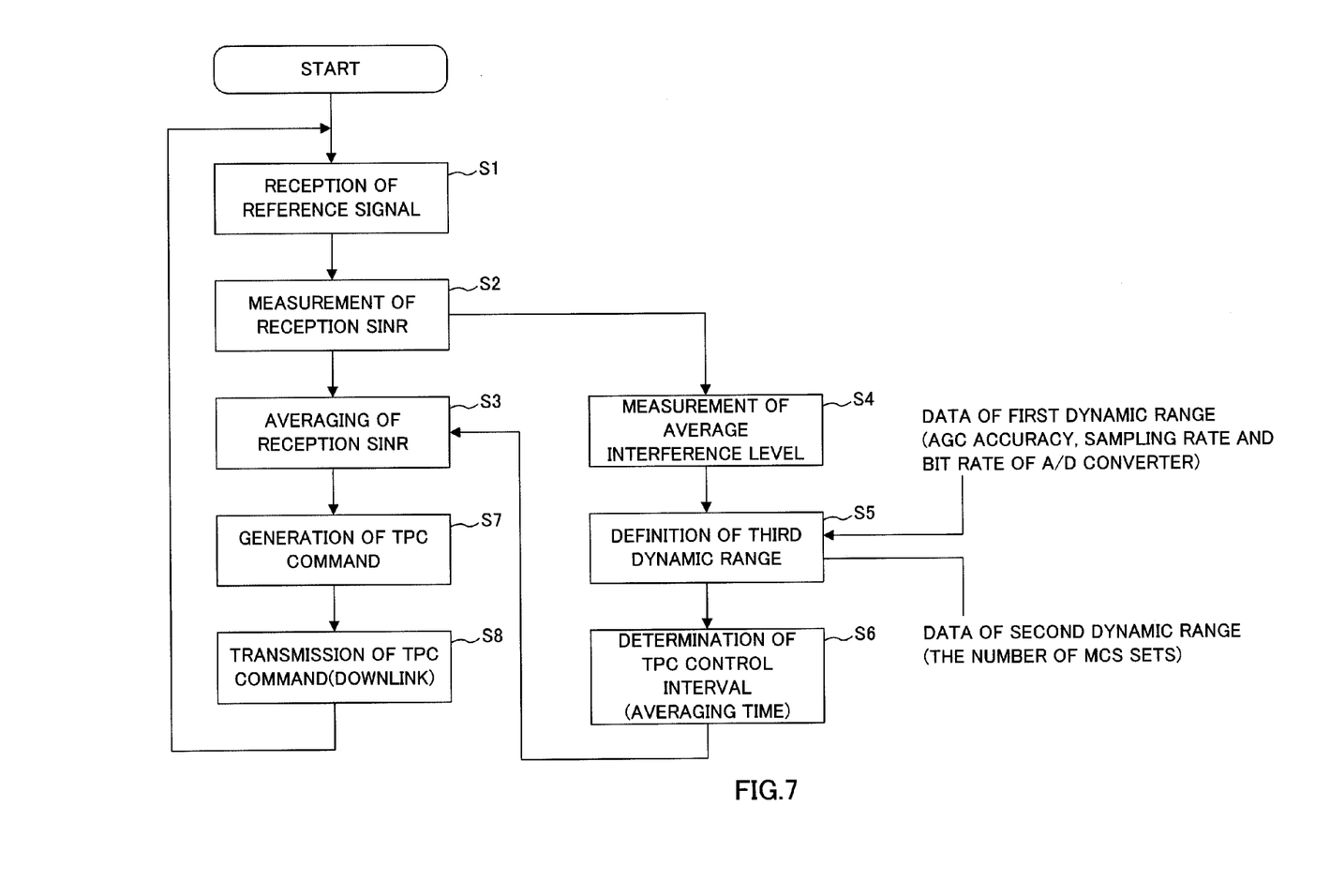
FIG. 7 is a schematic flow diagram of TPC control interval determination and closed-loop TPC performed in the base station apparatus.

FIG. 7 is a schematic flow diagram of the determination of TPC control interval and closed-loop TPC performed in the base station apparatus 10. Before starting communications, the base station apparatus 10 obtains the dynamic range of the base station apparatus comprised of an overlapping region of the first reception-allowable range and the second reception-allowable range without considering the interference level of the reference signal, and initially sets the time period for averaging reception quality determined corresponding to the obtained dynamic range size of the base station apparatus. After starting communications, the base station apparatus 10 receives a reference signal transmitted from the mobile station 30 on the PUSCH (step S1), and measurers the reception SINR in the reception SINR measuring section 24 as the reception quality (step S2), while further measuring the average interference level of the reference signal in the reception SINR measuring 24 (step S4). The measured reception SINR is input to the transmission power control section 25, and the average interference level is input to the control interval determining section 26. The control interval determining section 26 defines a region in which the first reception-allowable range and the second reception-allowable range overlap each other, as shown in FIG. 1, as a dynamic range of the base station apparatus (step S5). The first reception-allowable range as shown in FIG. 1 is the dynamic range of reception SNR determined from accuracy of AGC in the amplifying section 12 and the sampling rate and the number of quantization bits in the A/D converter in the layer 1 processing section 21 each in the base station apparatus 10. These items of data are fixed in each base station apparatus 10, and only required to be input in initial setting. Meanwhile, the second reception-allowable range is the dynamic range of reception SNR to achieve required throughput determined from the number ("15" in the example shown in FIG. 5) of MCS sets selectable in the MAC processing section 22, and the average interference level measured in step S4. The number of MCS sets is fixed in each base station apparatus 10 and is input in initial setting, and the average interference level is measured at predetermined intervals. Accordingly, in the dynamic range of the base station apparatus, the dynamic range size varies corresponding to the variation in the average interference level after the system operates. Then, corresponding to the dynamic range size of the base station apparatus, determined is the time period "t" for averaging reception quality that is the control interval of TPC (step S6). When the dynamic range of the base station apparatus is wide, corresponding to decreases in the probability that the reception SNR falls outside the dynamic range, the time period "t" for averaging reception SINR that is the control interval of TPC is lengthened. Meanwhile, when the dynamic range of the base station apparatus is narrow, the time period "t" for averaging reception SINR is shortened to decrease the probability that the reception SINR falls outside the dynamic range.

The base station apparatus 10 averages reception SINRs using the time period "t" determined corresponding to the dynamic range size of the base station apparatus (step S3), and for example, generates a difference value between the target reception SINR and the averaged reception SINR as a TPC command (step S7). The generated TPC command is notified to the mobile station 30 in downlink (step S8).

As described above, according to the Embodiment, since the base station apparatus 10 defines the dynamic range of the base station apparatus that is the dynamic range of reception SNR such that the base station apparatus 10 operates properly, and determines the control interval of TPC corresponding to the dynamic range size of the base station apparatus, it is possible to set the long TPC control interval enabling the merits of fast frequency domain scheduling and fast AMC to be obtained when the dynamic range of the base station apparatus is wide, while setting the short TPC control interval enabling the probability that the reception SNR falls outside the dynamic range of the base station apparatus to be decreased when the dynamic range of the base station apparatus is narrow, and it is possible to prevent the occurrence of situations that it is not possible to perform communications.

Industrial Applicability

The present invention is applicable to the closed-loop transmission power control method in uplink of Rel-8 LTE.

The invention claimed is:

1. A closed-loop transmission power control method comprising the steps of,
    initially setting a time period for averaging reception quality corresponding to an overlapped size of a region of overlapping a first reception-allowable range depended on reception capability of a base station apparatus, with a second reception-allowable range depended on the number of a modulation and coding scheme set, each set achieving required throughput;
    measuring reception quality and an interference level of a signal received in uplink;
    defining the overlapped size corresponding to the measured interference level to vary the time period, corresponding to the defined overlapped size;
    averaging the reception quality during the varied time period to generate transmission power control information indicative of uplink transmission power to be controlled in a terminal apparatus using a difference value between the averaged reception quality and target reception quality; and
    transmitting the generated transmission power control information to the terminal apparatus in downlink.

2. The closed-loop transmission power control method according to claim 1, wherein the time period is longer as the overlapped size is wider.

3. The closed-loop transmission power control method according to claim 2, wherein the time period is shorter as the overlapped size is narrower.

4. The closed-loop transmission power control method according to claim 1, wherein the time period is shorter as the overlapped size is narrower.

5. The closed-loop transmission power control method according to claim 1, wherein the reception capability of the base station apparatus includes accuracy of auto gain control for controlling reception power of the signal received in uplink to fixed power, and a sampling rate and the number of quantization bits in converting the signal with the controlled fixed power into a digital signal.

6. A radio base station apparatus comprising:
    a reception quality measuring section configured to measure reception quality and an interference level of a signal received in uplink;
    a control interval determining section configured to initially set a time period for averaging reception quality corresponding to an overlapped size of a region of overlapping a first reception-allowable range depended on reception capability of a base station apparatus, with a second reception-allowable range depended on the number of a modulation and coding scheme set, each set achieving required throughput, and configured to define the overlapped size corresponding to the measured interference level to vary the time period, corresponding to the defined overlapped size;
    a transmission power control section configured to average the reception quality during the time period varied in the control interval determining section to generate transmission power control information indicative of uplink transmission power to be controlled in a terminal apparatus using a difference value between the averaged reception quality and target reception quality; and
    a transmission section configured to transmit the transmission power control information generated in the transmission power control section in downlink.

* * * * *